US005553882A

United States Patent [19]

Unruh

[11] Patent Number: 5,553,882
[45] Date of Patent: Sep. 10, 1996

[54] SNOWMOBILE SECUREMENT SYSTEM

[76] Inventor: Stephen N. Unruh, 1061 Kenneth St., Eagan, Minn. 55121

[21] Appl. No.: 296,424

[22] Filed: Aug. 26, 1994

[51] Int. Cl.⁶ ....................................................... B60P 7/08
[52] U.S. Cl. ................................. 280/508; 410/3; 410/77
[58] Field of Search ............................... 280/508, 509, 280/504, 477; 410/2, 3, 4, 9, 19, 77, 80, 81

[56]  References Cited

U.S. PATENT DOCUMENTS

| | | | |
|---|---|---|---|
| 788,692 | 5/1905 | Ammann | 280/509 |
| 806,216 | 12/1905 | Van Wye | 280/509 |
| 856,795 | 6/1907 | Morris | 280/509 |
| 2,525,471 | 10/1950 | Balzer | 280/508 |
| 3,437,354 | 4/1969 | Hetteen | 280/415 |
| 3,731,946 | 5/1973 | Westcott | 280/24 |
| 3,762,736 | 10/1973 | Johnson et al. | 280/24 |
| 3,797,846 | 3/1974 | Pevic | 280/24 |
| 4,222,698 | 9/1980 | Boelter | 414/477 |
| 4,353,563 | 10/1982 | Foster | 280/24 |
| 4,856,799 | 8/1989 | Hawn | 280/24 |
| 5,193,835 | 3/1993 | Sheets | 280/508 |
| 5,203,655 | 4/1993 | Persau | 410/3 |
| 5,259,720 | 11/1993 | Lobner | 414/483 |
| 5,387,070 | 2/1995 | Roeling | 280/508 |

*Primary Examiner*—Karin L. Tyson
*Attorney, Agent, or Firm*—Joel D. Skinner, Jr.

[57]  ABSTRACT

A hitch for securing a snowmobile to a trailer. The hitch comprises a base for connection to the trailer, which includes a flat, horizontal plate which is connectable to the trailer floor, and a vertical post extending upwardly from the plate. An actuator is supported in a fixed position by the base for releasable latching of the snowmobile. The actuator has a vertical oriented shaft assembly, a contact member pivotally connected to the shaft assembly, the contact member movably contacting and enclosing a connection member on the snowmobile, and a latch member for holding the contact member in a predetermined latched position. The hitch further comprises a pair of arms, each being attached at one end proximate a top end of the post and extending forwardly and downwardly. At least one arm further extends outwardly with respect to the other arm to form a predetermined angle. The arms stabilize the post and guide the snowmobile connection member toward the actuator.

19 Claims, 6 Drawing Sheets

SNOWMOBILE SECUREMENT SYSTEM

BACKGROUND OF THE INVENTION

1. Field of the Invention

This invention relates to a securement apparatus, and more particularly to a hitch for use in securing snowmobiles or other machinery. The securement hitch of this invention is particularly useful for securing snowmobiles in a fixed position for transport on a trailer.

2. Background Information

In the past, various devices and methods have been used to hitch snowmobiles and other machinery. However, these devices and methods have significant limitations and shortcomings. A common device for securing snowmobiles to a transport trailer comprises a bar which is positioned through a standard aperture in each front ski, and a screw-type mechanism which holds the bar in a fixed position on the floor of a trailer. There are several problems with this device. First, hitching or latching is not automatic. The device requires the operator of the snowmobile to position the snowmobile first, for example by riding the snowmobile onto the trailer, and then to either dismount the snowmobile and manipulate the bar and screw means to effectuate hitching, or to have a helper manipulate the bar and screw means. Further, manipulation of the screw means can be time consuming. A second problem is that the device requires precise positioning, both laterally and longitudinally, of the snowmobile prior to hitching. This typically leads to frequent repositioning of the snowmobile in order to accomplish hitching. A third problem is that the hitch is typically loose and the snowmobile is therefore prone to move during transport. This causes instability in the trailer and damage to hitch, trailer and snowmobile surfaces. A fourth problem is that the screw means typically requires a large hole through the floor of the trailer for mounting of the screw means. A final problem is that due to the floor mounted position of the screw means, it is subject to corrosion and frequent jamming due to ice, moisture, dirt, and road chemicals.

Despite the need in the art for a snowmobile hitch which overcomes the shortcomings and limitations of the prior art, none insofar as is known has been developed or proposed. Accordingly, it is an object of the present invention to provide an improved snowmobile hitch which is automatic, easy to install and which can be used by a single operator, is useable with a variety of common ski designs, is durable and provides a secure hitch. It is a further object of this invention to provide a snowmobile which is economical to produce and which overcomes the limitations and shortcomings of the prior art.

SUMMARY OF THE INVENTION

The invention provides a hitch for securing a snowmobile to a trailer. The hitch comprises a base for connection to the trailer and an actuator supported in a fixed position by the base for releasable latching of the snowmobile. The actuator has a vertical oriented shaft assembly and a contact member pivotally connected to the shaft assembly. The contact member movably contacts and encloses a connection member on the snowmobile. The actuator also includes a latch member for holding the contact member in a predetermined latched position.

In a preferred embodiment the shaft assembly is fixed to the post proximate its top and comprises a sleeve fixed to the post, a shaft rotatably disposed in the sleeve and means for connecting the contact member to the shaft. Additionally, the contact member comprises a first portion having a linear configuration of a predetermined length, the first portion being for contact with the connection member of the snowmobile; a second portion having a U-shaped configuration and being connected to one end of the first portion, the second portion being for connection to the shaft assembly; and a third portion having a linear configuration and of a predetermined length, and being connected at one end to one end of the second portion, the third portion being for enclosing the connection member of the snowmobile. Finally, the preferred embodiment further includes a pair of arms attached at one end proximate a top end of the post and extending forwardly and downwardly. At least one arm further extends outwardly with respect to the other arm to form a predetermined angle. The arms stabilize the post and guide the snowmobile connection member toward the actuator.

The snowmobile hitch of the present invention to provides an improved snowmobile hitch which is automatic, easy to install and which can be used by a single operator, is useable with a variety of common ski designs, is durable and provides a secure hitch. The snowmobile hitch is also economical to produce.

The benefits of this invention will become clear from the following description reference to the drawings.

DESCRIPTION OF THE PREFERRED EMBODIMENTS

The apparatus of the present invention is usable to secure a snowmobile or similar device in a fixed position, for example on a trailer for transport.

Referring to FIGS. 1–3 and 7, the snowmobile hitch 10 of the present invention basically comprises a base 11, a pair of arms 12a–b, and an actuator 13. The base 11 is connected to the floor of a transport trailer at a predetermined position and supports the actuator 13 at that position. The arms 12 guide one ski 14 of the snowmobile toward the actuator 13 and further supports and stabilizes the actuator 13. The actuator 13 automatically engages and secures the ski 14 as is described further below.

The base 11 comprises a horizontal plate 16 and a vertical post 18. The plate 16 is a rectangular, flat structure preferably constructed of steel. The post 18 is a rectangular steel structure, preferably with a hollow interior. The post 18 is fixed to the center of the plate 16, preferably via a weld. The actuator 13 is disposed at the top of the post 18, the post 18 having a height such that the actuator 13 is aligned for mating with a connecting rod of a standard snowmobile front ski.

Figure 1:
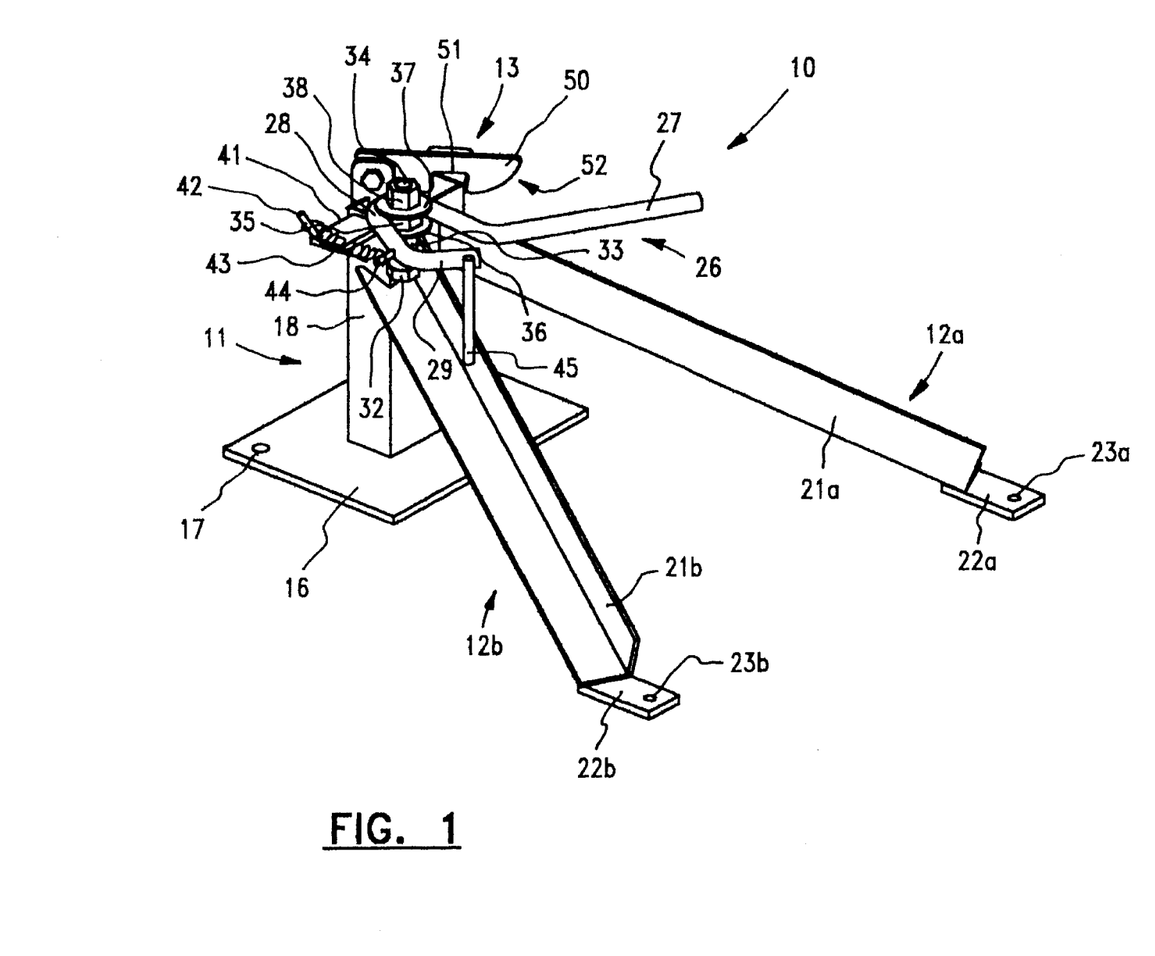
FIG. 1 is a perspective view of the snowmobile hitch of the present invention.
Figure 8:
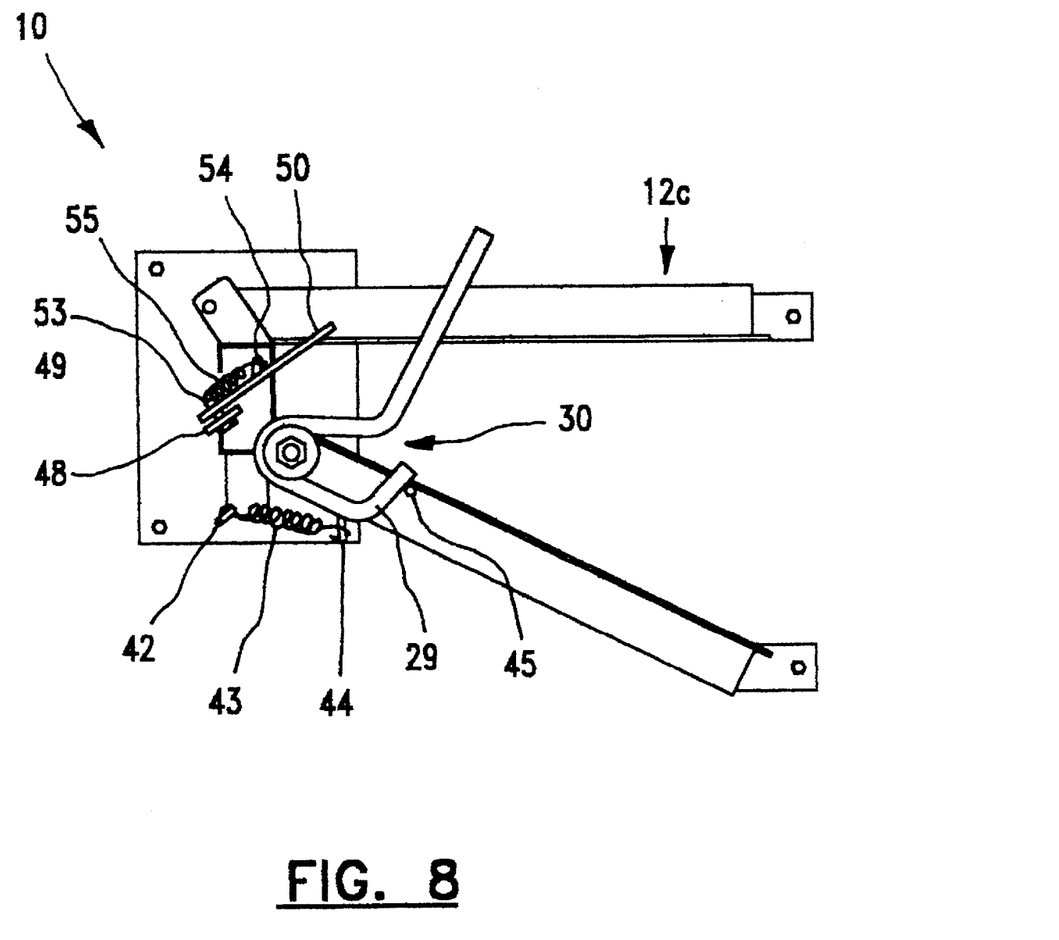
FIG. 8 is a top view of another alternative embodiment of the hitch.

The arms 12a,b of the hitch 10 are preferably constructed of steel angles 21 a,b which are connected proximate the top of the post 18 via a weld. The arms 12a,b extend outwardly (forward) and downwardly, and each terminate at a foot 22a,b. Each foot 22 has an aperture 23a,b for reception of a bolt for connection to the trailer floor. The arms 12a,b slant away from each other to form an angle "c", between each other, of approximately 50 degrees. Referring also to FIG. 8, in an alternative embodiment, one of the arms 12c is extended forward in a straight line with respect to the front or mating side of the hitch 10. This permits the hitch to be place closer to the side edge of the trailer floor, for example in the case of a thinner trailer. This orientation of one of the arms reduces the angle "c" between the arms to approximately 30 degrees. The arms 12 direct the incoming ski connecting rod toward the actuator 13 for mating. The connection of the feet 22 to the trailer floor enable the arms 12 to tolerate the force of contact from and redirection of the misaligned ski connecting rods. This structure also serves to stabilize and strengthen the post 18 as the incoming ski rod 15 contacts the actuator 13.

Figure 2:
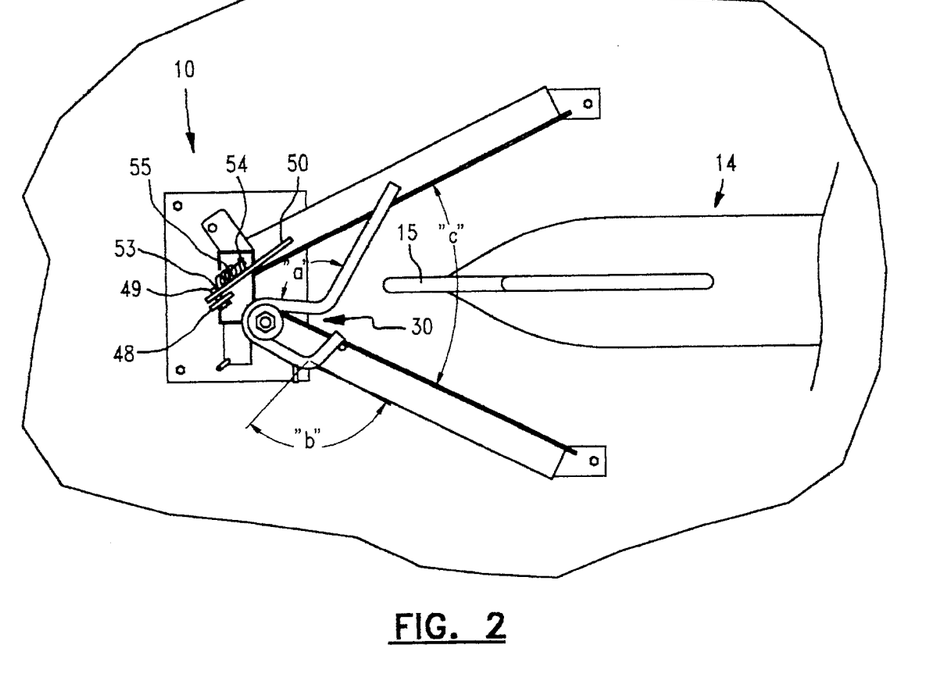
FIG. 2 is a top view of the snowmobile hitch wherein it is in position for reception of a snowmobile ski.
Figure 3:
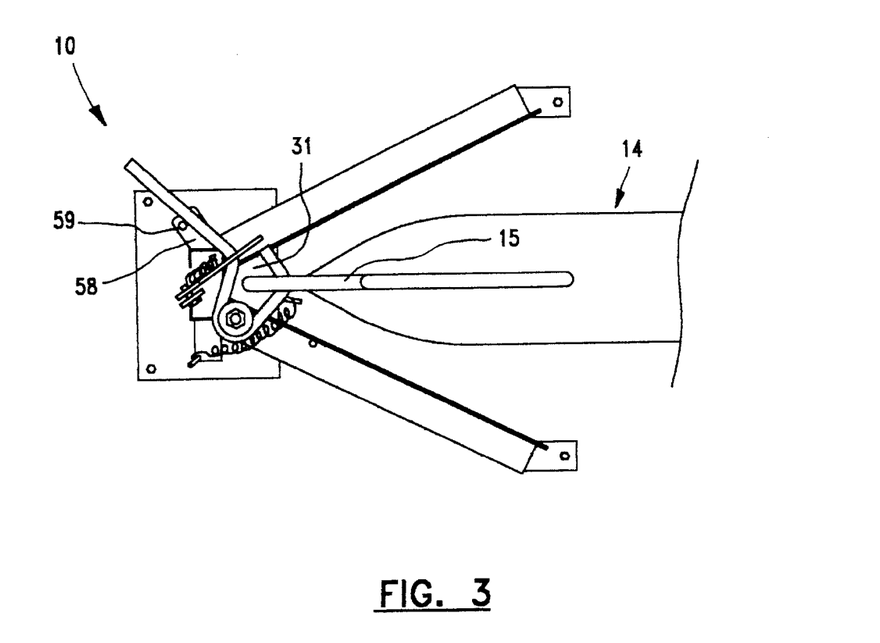
FIG. 3 is a top view of the snowmobile hitch wherein it is latched and securing the ski.

The actuator 13 comprises an actuation or contact member 26 which is pivotally connected proximate the top end of the post 18. Various other elements, described below, provide pivotal connection, movement limitation and latching of the actuation member 26. In FIG. 2, the actuation member 26 is shown in a normally open state, wherein the hitch 10 is able to receive an incoming ski 14. FIG. 3 shows the actuation member 26 in a closed or actuated state, wherein the hitch has received the ski rod 15 and is holding it in place. The actuation member 26 is preferably constructed of a unitary piece of cylindrical or rod shaped steel or a similar rigid metallic substance. The rod 26 comprises first second and third portions 27–29. Referring again to FIG. 2, the first portion 27 has a linear configuration of a predetermined length such that it extends across substantially all of the zone between the two arms 12 when the hitch 10 is in an open state. In this position, the first portion will be contacted by the incoming ski rod 15. The second portion 28 has a U-shaped configuration and is connected to one end of the first portion 27. An angle "a" is formed between the first and second portions of approximately 115 degrees. The second portion 28 provides a pivot point for the first portion 27 and aids in guiding the ski to a latchable position. The third portion 29 is a short linear segment of rod which is connected at one end to one end of the second portion 28. An angle "b" is formed between the second and third portions of approximately 115 degrees. An access region 30 is defined by the actuation rod 26 into which the forward moving ski connector 15 is guided subsequent to contact with the first portion 27. As the ski rod 15 passes the point shown at the apex of angle "a", the ski subsequently makes contact with the fight side of the U-shaped second portion as it continues to move forward. Throughout the period of contact between the ski connector 15 and the actuator rod 26, the actuator rod 26 pivots counterclockwise, as viewed from above, due to the forward moving force of the ski. Referring again to FIG. 3, the actuator rod 26 has reached its point of full rotation wherein the forward motion of the ski 14 is stopped. The pivoted position of the rod 26 is latched at this point. And the ski connector 15 is disposed within the horizontally enclosed region 31. Any rearward movement of the ski 14 would be obstructed by the rod point located at the apex of angle "b". Any forward movement of the ski would be obstructed by the right side of the second portion 28. Any sideways movement of the ski rod 15 would be obstructed by the apex of the arms 12.

The actuation rod 26 pivots about a vertically oriented shaft 34 which is fixed to the post 18. The shaft 34 is preferably threaded at its two ends. The bottom end of the shaft 34 is connected to a first nut 32 which is fixed to the post via a weld. A metal sleeve 33 surrounds the shaft 34 above the first nut 32. The sleeve 33 is also preferably welded to the post 18. A second nut 35 is threaded onto the shaft 34 at a predetermined point. A washer 36 and 37 is disposed above and below the second nut 35. The convex or inwardly facing apex region of the second portion 28 of the actuation rod 26 is fixed to the second nut 35, preferably via a weld. This allows the actuation rod 26 to rotate with the shaft 34. Finally, a third nut 38 is connected to the top of the rod 34. The third nut 38 and washers 36 and 37 strengthen and stabilize the above-referenced pivoting assembly.

Referring again to FIG. 1, the actuation rod 26 is held in a normally open state, absent a ski in place, by tension from a first spring 43. The first spring 43 is attached to the actuation rod 26 proximate the apex of angle "b" via a connection peg 44. The opposite end of the spring 43 is connected to a first extension 41 connected to the rear of the top of the post 18, via a peg 42. The spring 43 permits pivoting of the actuation rod 26, but returns the actuation rod 26 to an open position upon release of the latched rod 26. The precise location of the open position is determined by Stop or limit post 45. The stop post 45 prevents the spring biased movement of the actuation rod 26 beyond a set point via contact with the third portion 29 thereof.

Figure 7:
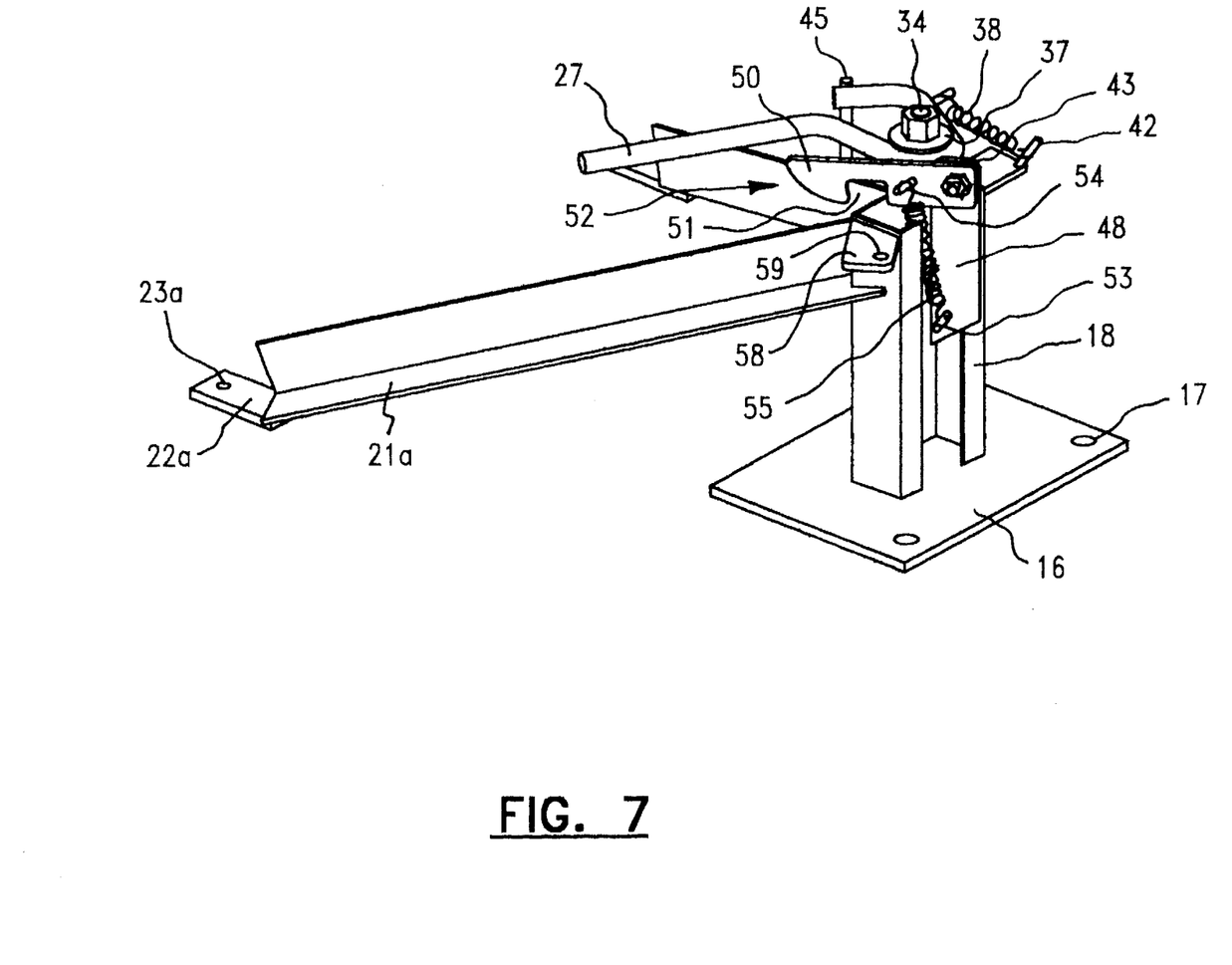
FIG. 7 is another perspective view of the hitch shown in FIG. 1.

Referring also to FIGS. 2, 3 and 7 the actuation rod 26 is latched or held in place upon attaining its fully closed pivotal position, via a latch arm 50. The latch arm 50 is a vertically moveable flat metal structure with a curved forward end 52 and a capture notch 53 on its bottom surface. The capture notch 51 engages the actuation rod 26 in the closed position, proximate the apex of angle "a". The latch arm 50 pivots at its rearward end about a horizontally oriented bolt and nut 49. The pivot point is disposed at a second extension 48 connected to the back side of the top of the post 18. The latch arm 50 is held in a normally down position by a second spring 55 which is attached proximate the pivot point of the latch arm 50 via a top peg 54, and to the post via a bottom peg 53. The spring 55 permits upward pivotal movement of the latch arm 50 as the first portion 27 of the actuation rod 26 contact the curved forward/bottom surface 52. After the portion 27 is pushed past the surface 52 it reaches the capture notch 51, which is brought down over the portion 27 by force from the spring 55.

An extension 58 is disposed at the top, right back side of the post 18. The extension has an aperture 59 for mating with a clasp of a standard key or combination lock (not shown). This enables the user to lock the actuator rod 26 in a closed position for security.

Figure 4:
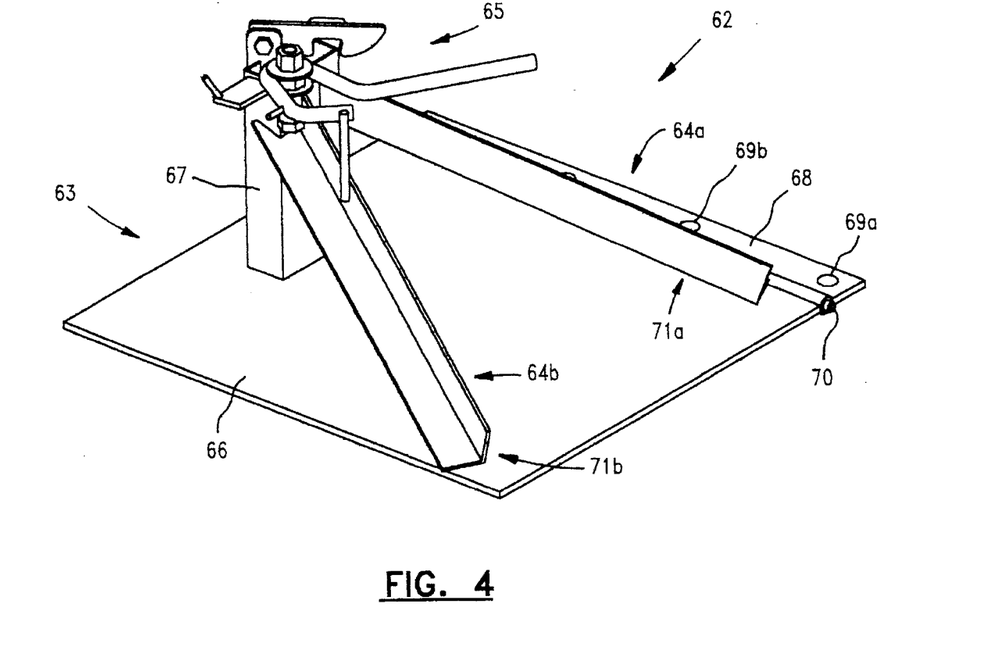
FIG. 4 is a perspective view of an alternative embodiment of the snowmobile hitch of the present invention for rearward mounting on a trailer, wherein the hitch is capable of being pivoted upwardly and to one side to allow passage of a snowmobile to the front of a trailer.
Figure 5:
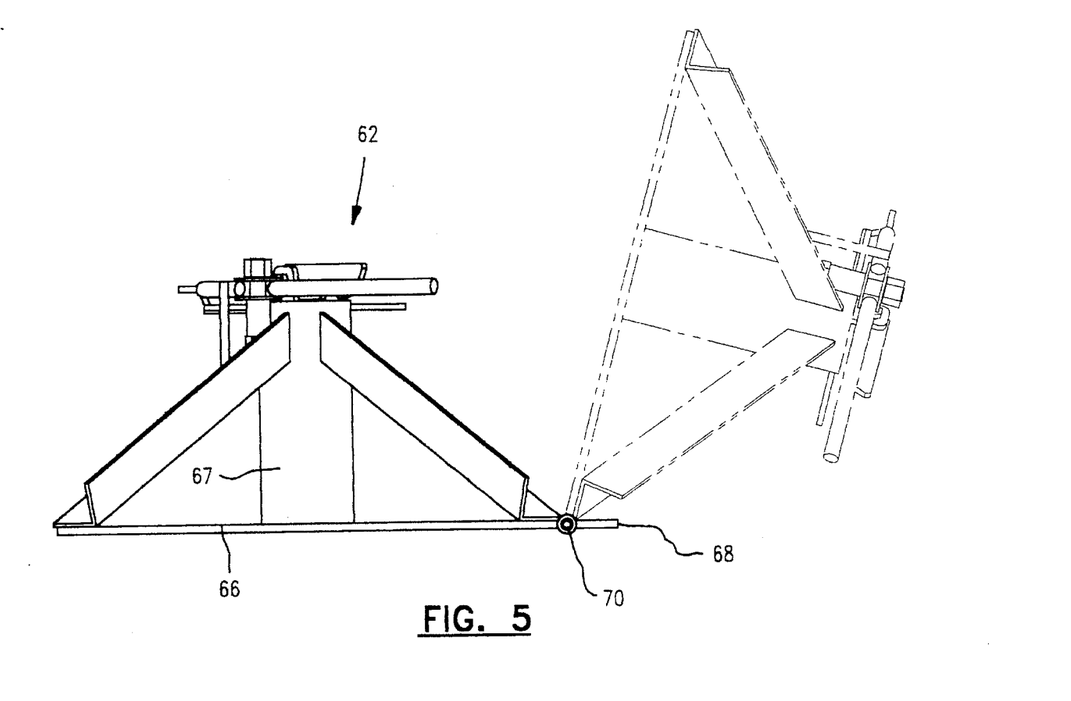
FIG. 5 is a frontal view showing the pivoting of the hitch shown in FIG. 4.
Figure 6:
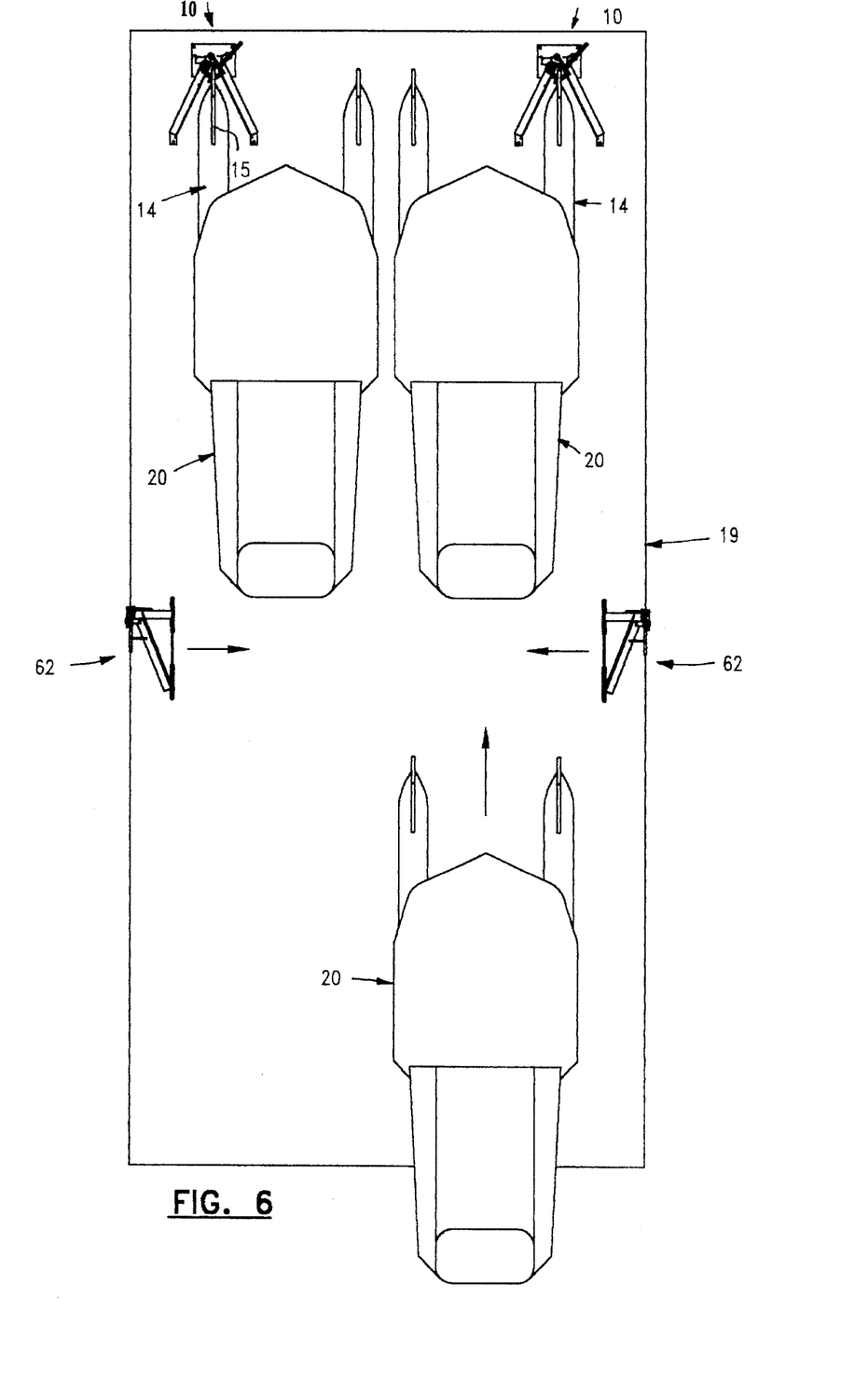
FIG. 6 is a plan view of the mounting of four (4) hitches to a snowmobile trailer.

Referring to FIGS. 4–6, another embodiment of the snowmobile hitch 62 is illustrated. This embodiment is useful for example with a trailer 19 for holding four snowmobiles 20 in two rows of two sleds 20. This hitch 62 design is used in the second or rearward row as it can be moved (pivoted upwardly and to one side) out of the way to allow sleds loaded from the back of the trailer to be moved to the front of the trailer and be hitched by the from hitches 10. The hitch 62 comprises a base 63, a pair of arms 64 and an actuator 65. The actuator 65 is substantially similar to the actuator shown and described with respect to the previous embodiments. The base 63 comprises a larger plate 66, a post 67, a flange strip 68 and a hinge 70. The post 67 is disposed centrally near the back edge of the plate 66. The distal ends 71a,b of the arms 64a,b are fixed to the base plate 66, for example via welds. The flange 68 has a plurality of apertures 69a,b for securing it to the floor of the trailer via screws, bolts or the like. The hinge 70 permits the base plate 66 and the remaining elements as the hitch 62 (attached to the top thereof) to be moved out of the path of snowmobiles, other machinery or the user.

As many changes are possible to the embodiments of this invention utilizing the teachings thereof, the descriptions above, and the accompanying drawings should be interpreted in the illustrative and not the limited sense.

The invention claimed is:

1. A hitch for securing a snowmobile to a trailer, comprising:
   (a) a base for connection to the trailer; and
   (b) an actuator supported in a fixed position by said base for releasable latching of the snowmobile, said actuator having a vertical oriented shaft assembly, a contact member pivotally connected to said shaft assembly and comprising a first portion having a linear configuration of a predetermined length, said first portion being for contact with the connection member of the snowmobile, a second portion having a U-shaped configuration and being connected to one end of said first portion, said second portion being for connection to said shaft assembly, and a third portion having a linear configuration and of a predetermined length, and being connected at one end to one end of said second portion, said third portion being for enclosing the connection member of the snowmobile, said contact member adapted for movable contact with and enclosure of a connection member on the snowmobile, said actuator further comprising a latch member for holding the contact member in a predetermined latched position.

2. The hitch of claim 1, wherein the base comprises a flat, horizontal plate which is connectable to the trailer floor, and a vertical post extending upwardly from said plate.

3. The hitch of claim 2, wherein said plate has a flange disposed along a side edge of said plate, said flange being for securement to the trailer floor, said flange having a hinge which is connectable to the trailer floor, whereby said plate and post are adapted for pivotal movement away from the trailer floor, about said hinge.

4. The hitch of claim 2, further comprising a pair of arms, said arms each being attached at one end proximate a top end of said post and are adapted for connection at another end to the trailer floor, said arms stabilizing said post and are adapted for guiding the snowmobile connection member toward said actuator.

5. The hitch of claim 4, wherein both said arms extend forwardly and downwardly, and wherein at least one said arm extends outwardly with respect to the other said arm to form a predetermined angle.

6. The hitch of claim 5, wherein both said arms extend outwardly with respect to each other and said predetermined angle is approximately 50 degrees.

7. The hitch of claim 5, wherein one said arm extends outwardly with respect to the other and said predetermined angle is approximately 30 degrees.

8. The hitch of claim 2, further comprising a pair of arms, said arms each being attached at one end proximate a top end of said post and at another end to said plate, said arms stabilizing said post and guiding the snowmobile connection member toward said actuator.

9. The hitch of claim 2, wherein said shaft assembly is fixed to said post proximate its top and comprises a sleeve fixed to said post, a shaft rotatably disposed in said sleeve and means for connecting said contact member to said shaft.

10. The hitch of claim 1, wherein an angle "a" is formed between said first and second portions of approximately 115 degrees and an angle "b" is formed between said second and third portions of approximately 115 degrees.

11. The hitch of claim 10, wherein said third portion predetermined length is such that an access area is formed for reception of the snowmobile connection member.

12. The hitch of claim 1, further comprising means to hold the contact member in a predetermined, normally open position for receiving a snowmobile connection member.

13. The hitch of claim 12, wherein said means to hold is a spring connected to said contact member and to said post.

14. The hitch of claim 1, wherein said latch member comprises a latch plate, pivotally connected to said post at a rearward end, and having a connection notch disposed on a bottom side and a sloped contact surface disposed at a forward end.

15. The hitch of claim 14, wherein said latch member further comprises means to hold said latch member in a normally downward, latching position.

16. The hitch of claim 15, wherein said means to hold is a spring attached to said latch plate proximate its rearward end and to said post.

17. The hitch of claim 1, further comprising means to lock said contact member in a fixed position.

18. A hitch for securing a snowmobile to a trailer, comprising:
   (a) a base for connection to the trailer, said base including a flat, horizontal plate which is connectable to the trailer floor, and a vertical post extending upwardly from said plate;
   (b) an actuator supported in a fixed position by said base for releasable latching of the snowmobile, said actuator having a vertical oriented shaft assembly, a contact member pivotally connected to said shaft assembly, said contact member being adapted for movable contact with and enclosure of a connection member on the snowmobile, and a latch member for holding the contact member in a predetermined latched position, and wherein:
      (i) said shaft assembly is fixed to said post proximate its top and comprises a sleeve fixed to said post, a shaft rotatably disposed in said sleeve and means for connecting said contact member to said shaft, and
      (ii) said contact member comprises a first portion having a linear configuration of a predetermined length, said first portion being for contact with the connection member of the snowmobile; a second portion having a U-shaped configuration and being connected to one end of said first portion, said second portion being for connection to said shaft assembly; and a third portion having a linear configuration and of a predetermined length, and being connected at one end to one end of said second portion, said third portion being for enclosing the connection member of the snowmobile; and
   (c) a pair of arms, said arms each being attached at one end proximate a top end of said post and extending forwardly and downwardly, at least one said arm further extending outwardly with respect to the other said arm to form a predetermined angle, said arms stabilizing said post and being adapted for guiding the snowmobile connection member toward said actuator.

19. A hitch for securing a snowmobile to a trailer, comprising:

(a) a base for connection to the trailer, said base comprising a flat, horizontal plate which is connectable to the trailer floor, and a vertical post extending upwardly from said plate, said plate having a flange disposed along a side edge of said plate, said flange being for securement to the trailer floor, said flange having a hinge, whereby said plate and post are adapted for pivotal movement away from the trailer floor, about said hinge; and (b) an actuator supported in a fixed position by said base for releasable latching of the snowmobile, said actuator having a vertical oriented shaft assembly, a contact member pivotally connected to said shaft assembly, said contact member being adapted for movable contact with and enclosure of a connection member on the snowmobile, and a latch member for holding the contact member in a predetermined latched position.

* * * * *